US009736759B2

(12) United States Patent
Zhan

(10) Patent No.: US 9,736,759 B2
(45) Date of Patent: Aug. 15, 2017

(54) SERVICE CONTROL METHOD AND DEVICE

(71) Applicant: ZTE Corporation, Shenzhen (CN)

(72) Inventor: Yizhong Zhan, Shenzhen (CN)

(73) Assignee: XI'AN ZTE NEW SOFTWARE COMPANY LIMITED, Xi'an (CN)

( * ) Notice: Subject to any disclaimer, the term of this patent is extended or adjusted under 35 U.S.C. 154(b) by 0 days.

(21) Appl. No.: 14/441,331

(22) PCT Filed: Sep. 26, 2013

(86) PCT No.: PCT/CN2013/084331
§ 371 (c)(1),
(2) Date: May 7, 2015

(87) PCT Pub. No.: WO2014/071784
PCT Pub. Date: May 15, 2014

(65) Prior Publication Data
US 2015/0282049 A1     Oct. 1, 2015

(30) Foreign Application Priority Data
Nov. 7, 2012 (CN) .......................... 2012 1 0442039

(51) Int. Cl.
*H04W 48/08* (2009.01)
*H04W 28/18* (2009.01)
(Continued)

(52) U.S. Cl.
CPC ............. *H04W 48/08* (2013.01); *H04L 47/20* (2013.01); *H04W 8/18* (2013.01); *H04W 24/08* (2013.01); *H04W 28/02* (2013.01); *H04W 28/18* (2013.01)

(58) Field of Classification Search
CPC ........... H04L 12/14; H04L 47/20; H04Q 7/38; H04W 4/02; H04W 12/08; H04W 28/16;
(Continued)

(56) References Cited

U.S. PATENT DOCUMENTS

2004/0033806 A1    2/2004  Daniel
2011/0170412 A1*   7/2011  Ramadas ................ H04L 47/10
                                                              370/235
(Continued)

FOREIGN PATENT DOCUMENTS

CN          101562570 A       10/2009
CN          101848453 A        9/2010
(Continued)

OTHER PUBLICATIONS

International Search Report for corresponding application PCT/CN2013/084331 filed Sep. 26, 2013; Mail date Jan. 2, 2014.
(Continued)

*Primary Examiner* — Kamran Afshar
*Assistant Examiner* — Nicole Louis-Fils
(74) *Attorney, Agent, or Firm* — Cantor Colburn LLP

(57) ABSTRACT

Provided are a service control method and device. The method includes: acquiring related information of a user service and real-time status information of a service used by a user, wherein the related information includes: information needing to be referenced for regulating a control policy for the user service; based on the related information and real-time status information which are acquired, monitoring a current service status of a mobile network; and generating or adjusting user control policy information according to a result of the monitoring, and issuing the generated or adjusted user control policy information. The technical solution solves the problem in the related art of being unable to dynamically adjust the control policy of a user, thereby improving the mobile network quality, and improving the network experience of the user.

16 Claims, 3 Drawing Sheets

(51) Int. Cl.
*H04W 8/18* (2009.01)
*H04W 24/08* (2009.01)
*H04W 28/02* (2009.01)
*H04L 12/813* (2013.01)

(58) Field of Classification Search
CPC ....... H04W 4/26; H04W 48/08; H04W 28/18;
H04W 8/18; H04W 24/08; H04W 28/02
USPC .................. 455/406, 408, 414.1, 424, 67.11;
370/329, 338, 468
See application file for complete search history.

(56) References Cited

U.S. PATENT DOCUMENTS

| | | | | | |
|---|---|---|---|---|---|
| 2012/0164972 | A1* | 6/2012 | Shim | ..................... | H04W 24/02 |
| | | | | | 455/405 |
| 2012/0224538 | A1* | 9/2012 | Stenfelt | ................ | H04M 15/00 |
| | | | | | 370/328 |
| 2015/0066589 | A1* | 3/2015 | Tang | ...................... | H04L 67/10 |
| | | | | | 705/7.29 |

FOREIGN PATENT DOCUMENTS

| | | |
|---|---|---|
| CN | 102984751 A | 3/2013 |
| EP | 2312795 A1 | 4/2011 |

OTHER PUBLICATIONS

European Search Report for corresponding application EP 13 85 3106: Report dated Dec. 17, 2015.
Resource and Admission Control Functions in Next Generation Networks, Draft Recommendation ITU-T Y.2111 Revision, p. 1-235.

* cited by examiner

SERVICE CONTROL METHOD AND DEVICE

TECHNICAL FIELD

The disclosure relates to the field of communications, and in particular to a service control method and device.

BACKGROUND

With the development of radio communication technologies and the growing popularity of mobile intelligent terminals, more and more users choose to access the Internet through mobile terminals, to participate in activities such as office working, learning or entertainments, so that there are a wide variety of mobile data services. At present, 2G-based mobile data services are generally based on general packet radio service (GPRS) technologies. The core network of a mobile data service of 3G communication is also evolved on the basis of the GPRS. A gateway GPRS support node (GGSN) is a network element of a packet switch (PS) domain in the core network (CN) of the mobile network, and provides for data packets a gateway interface function between the GPRS network and an external data network. The deep packet identify (DPI) of the GGSN network element is able to perform deep identification on all the packet messages that are being transmitted so as to parse out information such as a service type. A policy and charging control (PCC) system based on the DPI technology provides flexible management of and control over control policies and charging policies for the mobile data services. In the system, a user may subscribe to a corresponding control policy package in a policy and charging rule function (PCRF). The control policy and the charging policy of the user and the service are issued by the PCRF based on a session state and subscription information. The corresponding control and charging are executed by the policy and charging enforcement function (PCEF) based on the policies issued from the PCRF. However, for mobile data network applications, the policy and charging control mechanism cannot dynamically adjust the control policies of the user according to information such as the current network state, the user's behaviour characteristics and the usage condition of the service to reversely control the mobile network; therefore, the following defects exist in the related art:

(1) when the mobile network has a high load, it is impossible to intelligently protect very important persons (VIP) or important and high timeliness mobile data services from influences;

(2) when the mobile network has a low load, it is impossible to intelligently improve the quality of service (QoS) of the network in the user policy, maximize the throughput of the network and improve the network experiences of the user; and (3) it is impossible to intelligently protect the mobile network load so as to avoid overload.

Regarding at least one of the above-mentioned problems in the related art, no effective solution has been proposed.

SUMMARY

The embodiments of the disclosure provide a service control method and device so as to at least solve the problem of being unable to dynamically adjust the user's control policy in the related art.

According to one aspect of the embodiments of the disclosure, a service control method is provided, wherein the method includes: acquiring relevant information of a user service and real-time state information of a service used by a user, wherein the above-mentioned relevant information of the user service includes: information needing to be referred to for regulating a control policy for the above-mentioned user service; monitoring a current service state of a mobile network according to the above-mentioned relevant information and the above-mentioned real-time state information which are acquired; and generating or adjusting user control policy information according to a result of the monitoring, and issuing the generated or adjusted user control policy information.

In an example embodiment, monitoring the current service state of a mobile network based on the above-mentioned relevant information and the above-mentioned real-time state information which are acquired includes: monitoring the current service state of the mobile network in accordance with a preset dimension and a preset index based on the above-mentioned relevant information and the above-mentioned real-time state information which are acquired, wherein the above-mentioned preset dimension is used for identifying a monitoring range of the mobile network.

In an example embodiment, the monitoring range identified by the above-mentioned preset dimension includes at least one of: a service used by an international mobile subscriber identification number, a service identified by service identification, a service born by a cell and a service born by a cell group.

In an example embodiment, the above-mentioned preset index includes: a traffic and/or a packet loss ratio.

In an example embodiment, the above-mentioned relevant information of the user service includes at least one of: a type of the above-mentioned user service and a quality of service of the above-mentioned user service; and the above-mentioned real-time state information includes at least one of: a real-time traffic of the above-mentioned user service.

In an example embodiment, monitoring the current service state of the mobile network in accordance with the preset dimension and the preset index based on the above-mentioned relevant information and the above-mentioned real-time state information which are acquired includes: aggregating, in a preset monitoring period, the relevant information and the above-mentioned real-time state information which are acquired in accordance with the above-mentioned preset dimension and the above-mentioned preset index to monitor the current service state of the mobile network, wherein when the preset monitoring period expires, a data region subjected to the aggregation is switched so that aggregation is performed on a new data region, and a value of a preset index associated with a preset dimension in accordance of which aggregation is performed on the switched data is reported, and the above-mentioned relevant information is acquired at an interval of a preset period, wherein the above-mentioned preset period is less than or equal to the above-mentioned monitoring period.

In an example embodiment, aggregating, in a preset monitoring period, the above-mentioned relevant information and the above-mentioned real-time state information in accordance with the above-mentioned preset dimension and the above-mentioned preset index to monitor the current service state of the mobile network includes: filtering the relevant information and the real-time state information involved in the aggregation according to a preset filtering condition in the above-mentioned preset dimension; and aggregating the relevant information and the real-time state information which are obtained through the filtering to monitor the current service state of the mobile network.

In an example embodiment, generating or adjusting the user control policy information according to the result of the monitoring and issuing the generated or adjusted user control policy information includes: in a case where a value of the preset index associated with the preset dimension of the switched data region is greater than a preset index threshold associated with the above-mentioned preset dimension, selecting N larger preset index values from preset value index values corresponding to low level services in accordance with the above-mentioned preset dimension, wherein N is a natural number; and generating or adjusting the user control policy information of the preset dimension associated with the above-mentioned N preset index values according to an adjustment ratio, and issuing the generated or adjusted user control policy information, wherein an authorized bandwidth in the above-mentioned user control policy information is an original authorized bandwidth multiplying the above-mentioned adjustment ratio, and the above-mentioned adjustment ratio is a downward adjustment ratio.

In an example embodiment, generating or adjusting the user control policy information according to the result of the monitoring and issuing the generated or adjusted user control policy information includes: in a case where a value of the preset index associated with the preset dimension of the switched data region is less than a preset index threshold associated with the above-mentioned preset dimension, selecting N preset index values with larger bandwidth utilization ratios from the preset index values in accordance with the above-mentioned preset dimension, wherein N is a natural number; and generating or adjusting the user control policy information of the preset dimension associated with the above-mentioned N preset index values according to an adjustment ratio, and issuing the generated or adjusted user control policy information, wherein an authorized bandwidth in the above-mentioned user control policy information is an original authorized bandwidth multiplying the above-mentioned adjustment ratio, and the above-mentioned adjustment ratio is an upward adjustment ratio.

In an example embodiment, the above-mentioned adjustment ratio is obtained using the following formula: (Top−(Band−Thr))/Top, where the above-mentioned Thr represents a threshold bandwidth of a cell, the above-mentioned Band represents a bandwidth that the cell actually uses, and the above-mentioned Top represents an actual total bandwidth of the preset dimension associated with the above-mentioned N preset index values.

According to another aspect of the embodiments of the disclosure, a service control device is provided, wherein the device includes: an acquisition component which is configured to acquire relevant information of a user service and real-time state information of a service used by a user, wherein the above-mentioned relevant information of the user service includes: information needing to be referred to for regulating a control policy for the above-mentioned user service; a monitoring component which is configured to monitor a current service state of a mobile network based on the above-mentioned relevant information and the above-mentioned real-time state information which are acquired; and a processing component which is configured to generate or adjust user control policy information according to a result of the monitoring, and issue the generated or adjusted user control policy information.

In the embodiments of the disclosure, relevant information of a user service and real-time state information of a service used by a user are acquired, wherein the relevant information of the user service includes: information needing to be referred to for regulating a control policy for the above-mentioned user service; a current service state of a mobile network is monitored based on the above-mentioned relevant information and the above-mentioned real-time state information which are acquired; and then user control policy information is generated or adjusted according to a result of the monitoring and the generated or adjusted user control policy information is issued. By virtue of the technical solution, the current service state of the mobile network can be monitored in real time based on the relevant information and the real-time state information of the user service, and then the user control policy information can be generated or adjusted dynamically according to the result of the monitoring and then issued, so that the reverse control over the mobile network is realised. For example, when the mobile network has a high load, very important persons or important and high timeliness mobile data services can be intelligently protected from influences; while when the mobile network has a low load, the authorized bandwidth of the service in the user policy can be intelligently improved, the throughput of the network can be maximized and the network experiences of the user can be improved. In addition, the mobile network load can also be intelligently protected so as to avoid overload, thereby improving the mobile network quality, and improving the network experience of the user.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
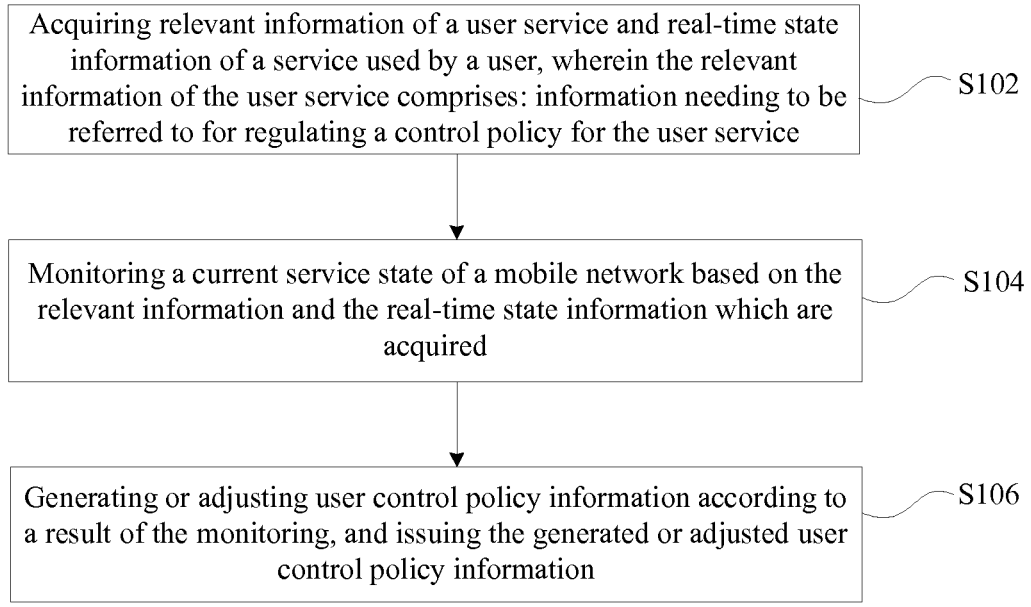
FIG. 1 is a flowchart of a service control method according to an embodiment of the disclosure.

The present embodiment provides a service control method. As shown in FIG. 1, the service control method includes steps S102 to S106.

Step S102: relevant information of a user service and real-time state information of a service used by a user are acquired, wherein the relevant information of the user service includes: information needing to be referred to for regulating a control policy for the user service.

Step S104: a current service state of a mobile network is monitored based on the relevant information and the real-time state information which are acquired.

Step S106: user control policy information is generated or adjusted according to a result of the monitoring, and the generated or adjusted user control policy information is issued.

By means of the above-mentioned steps, relevant information of a user service and real-time state information of a service used by a user are acquired, wherein the relevant information of the user service includes: information needing to be referred to for regulating a control policy for the above-mentioned user service; the current service state of a mobile network is monitored based on the above-mentioned relevant information and the above-mentioned real-time state information which are acquired; and then user control policy information is generated or adjusted according to the result of the monitoring and then issued. By virtue of the technical solution, the current service state of the mobile network can be monitored in real time according to the relevant information and the real-time state information of the user service, and then the user control policy information can be generated or adjusted dynamically according to the result of the monitoring and then issued, so that the reverse control over the mobile network is realised. For example, when the mobile network has a high load, very important persons or important and high timeliness mobile data services can be intelligently protected from influences; while when the mobile network has a low load, the authorized bandwidth of the service in the user policy can be intelligently improved, the throughput of the network can be maximized and the network experiences of the user can be improved. In addition, the mobile network load can also be intelligently protected so as to avoid overload, thereby improving the mobile network quality, and improving the network experience of the user.

In order to accurately and targetedly monitor the mobile network, in the present example embodiment, monitoring the current service state of the mobile network based on the above-mentioned relevant information and the above-mentioned real-time state information which are acquired includes: monitoring the current service state of the mobile network in accordance with a preset dimension and a preset index based on the above-mentioned relevant information and the above-mentioned real-time state information which are acquired, wherein the above-mentioned preset dimension is used for identifying a monitoring range of the mobile network. That is, the current service state of the mobile network may be monitored in accordance with the preset dimension and the preset index based on the above-mentioned relevant information and the above-mentioned real-time state information which are acquired. For example, a cell is taken as an example for the preset dimension and the traffic is taken as an example for the preset index, with a cell monitoring dimension in association with a traffic monitoring index, the total traffic in a element of cell can be counted.

In order to satisfy requirements of different application scenarios, in the present example embodiment, the monitoring range identified by the above-mentioned preset dimension may include at least one of: a service used by an international mobile subscriber identification number (IMSI), a service identified by service identification, a service born by a cell and a service born by a cell group.

In order to systematically monitor the current service state of the mobile network in detail, in the present example embodiment, the above-mentioned preset dimension may be a tree structure in which father-child relationships exist among various levels of dimensions. For example, cell identification may be taken as a monitoring dimension of the first level, user identification may be taken as a monitoring dimension of the second level and is subordinate to the cell dimension, and service identification may be taken as a monitoring dimension of the third level and is subordinate to the user dimension.

In order to satisfy requirements of different application scenarios, in the present example embodiment, the above-mentioned preset index may include: a traffic and/or a packet loss ratio.

In order to accurately monitor the current service state of the mobile network, in the present example embodiment, the above-mentioned relevant information may include at least one of: a type of the above-mentioned user service and a quality of service of the above-mentioned user service; and the above-mentioned real-time state information may include at least one of: a real-time traffic of the above-mentioned user service.

In order to monitor the current service state of the mobile network in real time, in the present example embodiment, monitoring the current service state of the mobile network in accordance with the preset dimension and the preset index based on the above-mentioned relevant information and the above-mentioned real-time state information which are acquired may include: aggregating, in a preset monitoring period, the relevant information and the real-time state information which are acquired in accordance with the above-mentioned preset dimension and the above-mentioned preset index to monitor the current service state of the mobile network, wherein when the preset monitoring period expires, a data region subjected to the aggregation is switched so that aggregation is performed on a new data region, and a value of a preset index associated with a preset dimension in accordance of which aggregation is performed on the switched data is reported, and the above-mentioned relevant information is acquired at an interval of a preset period, wherein the above-mentioned preset period is less than or equal to the above-mentioned monitoring period. For example, the above-mentioned preset monitoring period may be 5 minutes, then the relevant information and real-time state information received within 5 minutes are aggregated; and when 5 minutes expire, the result of the aggregation of the relevant information received within 5 minutes is reported, and the aggregation for the next monitoring period starts. When there are multiple levels of preset dimensions, then the aggregation may be performed level by level on the relevant information of each level.

In order to make the monitoring of the mobile network to be more effective and targeted, in the present example embodiment, aggregating, in the preset monitoring period, the above-mentioned relevant information and the above-mentioned real-time state information in accordance with the above-mentioned preset dimension and the above-mentioned preset index to monitor the current service state of the mobile network includes: filtering the relevant information and real-time state information involved in the aggregation according to a preset filtering condition in the above-mentioned preset dimension; and aggregating the relevant information and the real-time state information which are obtained through the filtering to monitor the current service state of the mobile network. When there are multiple levels preset dimensions, different filtering conditions may be set for various layers of preset dimension according to different requirements.

In order to dynamically adjust the user control policy information so as to reversely control the mobile network, in the present example embodiment, generating or adjusting the user control policy information according to the result of the monitoring and issuing the generated or adjusted user control policy information includes: in the case where a value of the preset index associated with the preset dimension of the switched data region is greater than a preset index threshold associated with the above-mentioned preset dimension, selecting N larger preset index values from preset value index values corresponding to low level services in accordance with the above-mentioned preset dimension, wherein N is a natural number; and generating or adjusting user control policy information of the preset dimension associated with the above-mentioned N preset index values according to an adjustment ratio, and issuing the generated or adjusted user control policy information, wherein an authorized bandwidth in the above-mentioned user control policy information is an original authorized bandwidth multiplying the above-mentioned adjustment ratio, and the above-mentioned adjustment ratio is a downward adjustment ratio.

In order to satisfy different application requirements and improve the flexibility of the present example embodiment, generating or adjusting the user control policy information according to the result of the monitoring and issuing the generated or adjusted user control policy information includes: in a case where a value of the preset index associated with the preset dimension of the switched data region is less than a preset index threshold associated with the above-mentioned preset dimension, selecting N preset index values with larger bandwidth utilization ratios from the preset index values in accordance with the above-mentioned preset dimension, wherein N is a natural number; and generating or adjusting the user control policy information of the preset dimension associated with the above-mentioned N preset index values according to an adjustment ratio, and issuing the generated or adjusted user control policy information, wherein an authorized bandwidth in the above-mentioned user control policy information is an original authorized bandwidth multiplying the above-mentioned adjustment ratio, and the above-mentioned adjustment ratio is an upward adjustment ratio.

In an example embodiment, the above-mentioned adjustment ratio may be obtained using the following formula: (Top−(Band−Thr))/Top, where the above-mentioned Thr represents a threshold bandwidth of a cell, the above-mentioned Band represents a bandwidth that the cell actually uses, and the above-mentioned Top represents an actual total bandwidth of the preset dimension associated with the above-mentioned N preset index values.

Figure 2:
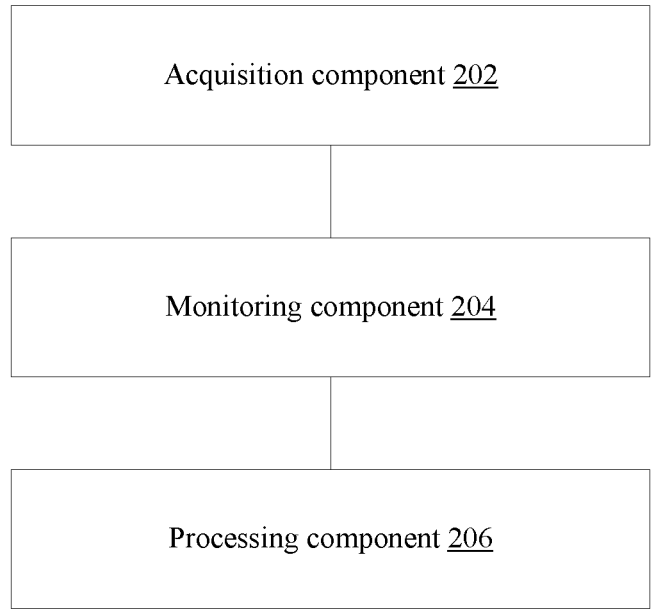
FIG. 2 is a structure diagram of a service control device according to an embodiment of the disclosure.

In the present example embodiment, an example service control device is provided. As shown in FIG. 2, the service control device includes: an acquisition component 202 which is configured to acquire relevant information of a user service and real-time state information of a service used by a user, wherein the relevant information of the user service includes: information needing to be referred to for regulating a control policy for the user service; a monitoring component 204 which is coupled with the acquisition component 202 and is configured to monitor a current service state of a mobile network based on the above-mentioned relevant information and the above-mentioned real-time state information which are acquired; and a processing component 206 which is coupled with the monitoring component 204 and is configured to generate or adjust user control policy information according to a result of the monitoring, and issue the generated or adjusted user control policy information.

In the above-mentioned example embodiment, by way of acquiring, by the acquisition component 202, relevant information of a user service and real-time state information of a service used by a user, wherein the relevant information of the user service includes: information needing to be referred to for regulating a control policy for the above-mentioned user service; monitoring, by the monitoring component 204, the current service state of a mobile network based on the above-mentioned relevant information and the above-mentioned real-time state information which are acquired; and then generating or adjusting, by the processing component 206, user control policy information according to the result of the monitoring and issuing the generated or adjusted user control policy information, the current service state of the mobile network can be monitored in real time based on the relevant information and the real-time state information of the user service, and then the user control policy information can be generated or adjusted dynamically according to the result of the monitoring and then issued. In this way, the reverse control over the mobile network is realised. For example, when the mobile network has a high load, very important persons or important and high timeliness mobile data services can be intelligently protected from influences; while when the mobile network has a low load, the authorized bandwidth of the service in the user policy can be intelligently improved, the throughput of the network can be maximized and the network experiences of the user can be improved. In addition, the mobile network load can also be intelligently protected so as to avoid overload, thereby improving the mobile network quality, and improving the network experience of the user.

In order to accurately and targetedly monitor the mobile network, in the present example embodiment, the above-mentioned monitoring component 204 is configured to monitor the current service state of the mobile network in accordance with a preset dimension and a preset index based on the above-mentioned relevant information and the above-mentioned real-time state information which are acquired, wherein the above-mentioned preset dimension is used for identifying a monitoring range of the mobile network.

Figure 3:
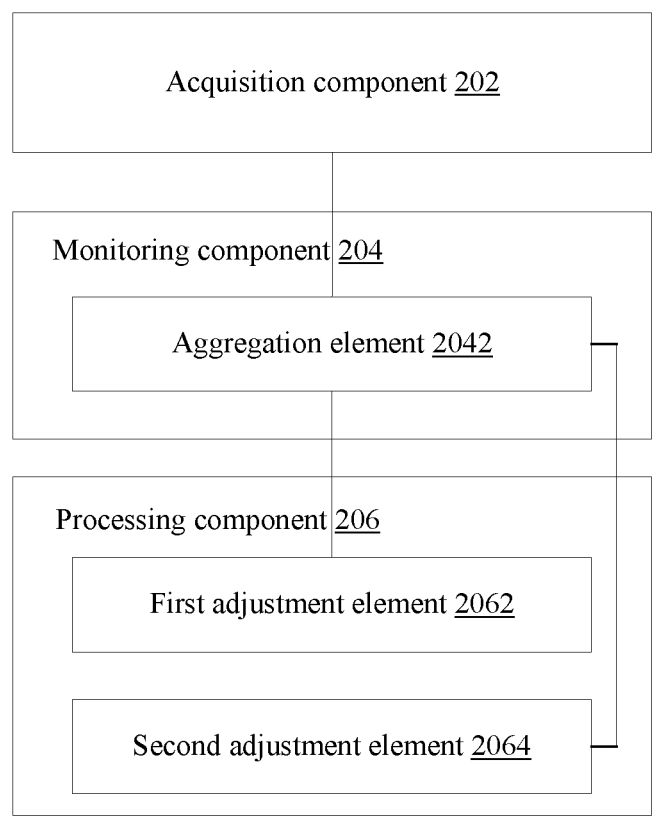
FIG. 3 is a structure diagram of another service control device according to an embodiment of the disclosure.

In order to monitor the current service state of the mobile network in real time, in the present example embodiment, as shown in FIG. 3, the above-mentioned monitoring component 204 includes: an aggregation element 2042 which is configured to aggregate, in a preset monitoring period, the relevant information and the real-time state information which are acquired in accordance with the above-mentioned preset dimension and the above-mentioned preset index to monitor the current service state of the mobile network, wherein when the preset monitoring period expires, an data region subjected to the aggregation is switched so that the aggregation is performed on a new data region, and a value of a preset index associated with a preset dimension in accordance of which aggregation is performed on the switched data is reported, and the above-mentioned relevant information is acquired at an interval of a preset period, wherein the above-mentioned preset period is less than or equal to the above-mentioned monitoring period.

In order to make the monitoring of the mobile network to be more effective and targeted, in the present example embodiment, the above-mentioned aggregation element 2042 is configured to filter the relevant information and real-time state information involved in the aggregation according to a preset filtering condition in the above-mentioned preset dimension; and aggregate the relevant information and the real-time state information which are obtained through the filtering to monitor the current service state of the mobile network.

In order to dynamically adjust the user control policy information so as to reversely control the mobile network, in the present example embodiment, as shown in FIG. 3, the above-mentioned processing component 206 includes: a first adjustment element 2062 which is configured to select, in a case where a value of the preset index associated with the preset dimension of the switched data region is greater than a preset index threshold associated with the above-mentioned preset dimension, N larger preset index values from preset index values corresponding to low level services in accordance with the above-mentioned preset dimension, wherein N is a natural number; and generate or adjust the user control policy information of the preset dimension associated with the above-mentioned N preset index values according to an adjustment ratio, and issue the generated or adjusted user control policy information, wherein an authorized bandwidth in the above-mentioned user control policy information is an original authorized bandwidth multiplying the above-mentioned adjustment ratio, and the above-mentioned adjustment ratio is a downward adjustment ratio.

In addition, a second adjustment element 2064 may be provided which is configured to select, in a case where a value of the preset index associated with the preset dimension of the switched data region is less than a preset index threshold associated with the above-mentioned preset dimension, N preset index values with larger bandwidth utilization ratios from the preset index values in accordance with the above-mentioned preset dimension, wherein N is a natural number; and generate or adjust the user control policy information of the preset dimension associated with the above-mentioned N preset index values according to an adjustment ratio, and issue same, wherein an authorized bandwidth in the above-mentioned user control policy information is an original authorized bandwidth multiplying the above-mentioned adjustment ratio, and the above-mentioned adjustment ratio is an upward adjustment ratio.

The above-mentioned various example embodiments will be described in detail below in conjunction with the accompanying drawings.

Figure 4:
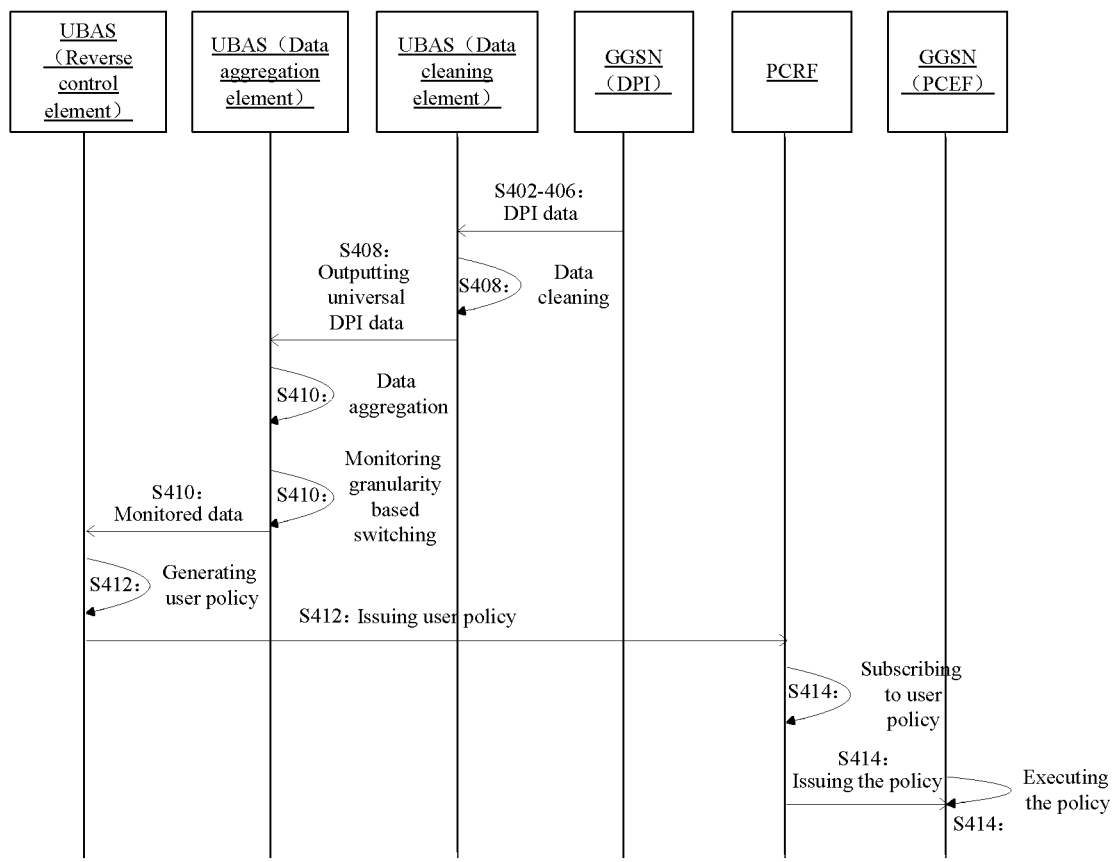
FIG. 4 is a flowchart of another reverse control method for a mobile network according to an embodiment of the disclosure.

In the present example embodiment, FIG. 4 is a flowchart of another reverse control method for a mobile network according to an embodiment of the disclosure. As shown in FIG. 4, the flow includes the steps S402 to S414.

Step S402: the levels of the services are graded according to the uses of service types and the levels of their respective additional values (for example, being graded into two levels, high value-added services and low value-added services, wherein the hyper text transport protocol (HTTP) service may belong to the high value-added services, while the peer to peer (P2P) service may belong to the low value-added services). A service type level list may be configured directly on a user behaviour analysis system (UBAS), and the UBAS may also acquire the service type level list from other systems.

Step S404: a monitoring model is established on the UBAS, wherein the monitoring model includes a monitoring dimension (an embodiment of the above-mentioned preset dimension) and a monitoring index (an embodiment of the above-mentioned preset index). In the present example embodiment, the monitoring model may be a tree structure in which father-child relationships exist among monitoring dimensions. For example, cell identification is taken as a monitoring dimension of the first level, user identification is taken as a monitoring dimension of the second level and is subordinate to the cell dimension, and service identification is taken as a monitoring dimension of the third level and is subordinate to the user dimension. In the present example embodiment, the monitoring index may include a traffic index. For example, traffic indexes of various service levels, authorized network bandwidths of the user services, etc. With a cell monitoring dimension in association with a traffic monitoring index, the total traffic in a element of cell can be counted. Therefore, the monitoring index and monitoring dimension will be associated therebetween. On the basis of the monitoring model, a threshold of the traffic index in the cell monitoring dimension is established. Regarding the threshold, a reverse control selection switch may be added, if the reverse control selection switch is opened, then only real-time monitoring is performed; otherwise, the reverse control will be triggered.

Step S406: a DPI component of a GGSN network element in a core network may detect a packet message in the network, identify relevant data (an embodiment of the above-mentioned relevant information) of an Internet service, and report the relevant data by means of a user datagram protocol (UDP) channel to the UBAS, or report the relevant data using a transmission control protocol (TCP) mode. In an example embodiment, UDP which has a higher transmission efficiency is recommended. In an example embodiment, in order to avoid DPI data report bringing influences to a network device and causing the performance to be reduced, DPI data may be reported in a periodic way, wherein the interval of a timer (an embodiment of the above-mentioned preset period) should be less than or equal to a monitoring granularity (embodied as the above-mentioned monitoring period) on the UBAS.

Step S408: after having received the DPI data, the UBAS may firstly send the DPI data to a data cleaning element (an embodiment of the above-mentioned acquisition component 202) to perform DPI data parsing. Since network devices from different manufactures may report DPI data having differences or different formats, the format and composition of the original DPI data can be described by an input model, and the parsed DPI data is likewise described by an output model. The data cleaning element may be specifically responsible for converting the original DPI data according to the input/output model, and the output DPI data may be sent to a data aggregation element.

Step S410: the data aggregation element (an embodiment of the above-mentioned monitoring component 204) processes the DPI data sent from the data cleaning element, and according to the output model of DPI data in step S408, the data aggregation element may acquire dimension information, statistical information and network parameters directly from the DPI data. The data aggregation element aggregates data in real time according to the monitoring model established in step S404. Specifically, the data aggregation firstly starts from the monitoring dimension of the first level of the model, and then the aggregation of the monitoring dimensions of various levels is performed downwards in sequence, wherein a filtering condition may be configured for each level, for example, some users or service types which are not to be involved in the aggregation can be excluded by means of filtering conditions. The data aggregation may judge periodically whether the monitoring granularity expires, and if the monitoring granularity expires, the data region subjected to the aggregation may be switched so that data aggregation of the next granularity may be performed on a new data region, wherein aggregation result of the switched aggregation data region may be sent to a reverse control element for processing.

Step S412: the reverse control element (an embodiment of the above-mentioned processing component 206) judges, according to the threshold established in step S404, whether the value of the total traffic index in a element of a cell exceeds threshold values set by the cell according to different states. When the total traffic index exceeds a traffic threshold value of a busy state of the cell, the traffics of low value-added services are ordered in a descending way in accordance with a combined monitoring dimension of the user (IMSI) and the service type (SI), N new authorized bandwidths of the IMS and IS combinations which rank higher are respectively calculated according to a discount percentage (the new authorized bandwidth is the original authorized bandwidth multiplying the discount percentage), and then user policy information (an embodiment of the above-mentioned user control policy information) consisting of the IMSI, the SI and the new authorized bandwidth is reported to the PCRF. When the total traffic index is lower than a traffic threshold value of an idle state of the cell, bandwidth utilization ratios corresponding to service traffics (the bandwidth utilization ratio is equal to an actual bandwidth of the service divided by the authorized bandwidth of the service) are ordered in a descending way in accordance with a combined monitoring dimension of the user (IMSI) and the service type (SI), N new authorized bandwidths of the IMSI and SI combinations which rank higher are respectively calculated according to a promotion percentage (the new authorized bandwidth is the original authorized bandwidth multiplying the promotion percentage), and then user policy information consisting of the IMSI, the SI and the new authorized bandwidth is reported to the PCRF.

Step S414: the user policy information such as the user identification, the service identification and an expected authorized bandwidth are reported to the PCRF via a simple object access protocol (SOAP) interface (and may also via interfaces in other forms), and the PCRF parses the reported user policy list, updates the user policy and inform the PCEF to execute the user policy.

In step S404, the monitoring model takes a cell as a monitoring dimension of the first level and may also take other relevant information such as a cell group as the monitoring dimension. When setting a monitoring threshold, an oscillation range may be set for the threshold value, and when the aggregation index value is in this range, no reverse control is triggered. The monitoring model is saved in the form of files and may also be saved in other modes. The threshold setting may be configured via an interface of the UBAS.

In step S412, in the present example embodiment, the discount percentage/promotion percentage (an embodiment of the above-mentioned adjustment ratio) is obtained using the formula: (Top−(Band−Thr))/Top, where Thr represents a threshold bandwidth of the cell, Band represents a bandwidth that the cell actually uses, and Top represents the actual total bandwidth of the N IMSI and SI combinations which rank higher. In order to prevent the discount/promotion ratio from having an abnormal value, the value interval thereof can be protected.

It can be seen from the above description that the above-mentioned example embodiment achieves the following technical effects: by acquiring relevant information of a user service, wherein the relevant information of the user service includes: information needing to be referred to for regulating a control policy for the above-mentioned user service; monitoring the current service state of a mobile network based on the above-mentioned relevant information which are acquired; and then generating or adjusting user control policy information according to the result of the monitoring and issuing the generated or adjusted user control policy information, the current service state of the mobile network can be monitored in real time based on the relevant information of the user service, and then the user control policy information can be generated or adjusted dynamically according to the result of the monitoring and then issued, so that the reverse control over the mobile network is realised. For example, when the mobile network has a high load, very important persons or important and high timeliness mobile data services can be intelligently protected from influences; while when the mobile network has a low load, the authorized bandwidth of the service in the user policy can be intelligently improved, the throughput of the network can be maximized and the network experiences of the user can be improved. In addition, the mobile network load can also be intelligently protected so as to avoid overload, thereby improving the mobile network quality, and improving the network experience of the user.

Obviously, those skilled in the art should know that each of the mentioned components or steps of the embodiments of the disclosure can be realized by universal computing devices; the components or steps can be focused on single computing device, or distributed on the network formed by multiple computing devices; selectively, they can be realized by the program codes which can be executed by the computing device; thereby, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. Thus, the embodiments of the disclosure are not limited to any particular combination of hardware and software.

The above description is only example embodiments of the disclosure and is not intended to limit the disclosure, and the disclosure can have a variety of changes and modifications for ordinary person skilled in the field. Any amendments, equivalent substitutions, improvements, etc. within the principle of the disclosure are all included in the scope of the protection defined by the claims of the disclosure.

INDUSTRIAL APPLICABILITY

The technical solutions of the embodiments of the disclosure can be applied to the field of mobile network applications, and the current service state of the mobile network can be monitored in real time based on the relevant information and the real-time state information of the user service, and then the user control policy information can be generated or adjusted dynamically according to the result of the monitoring and then issued, so that the reverse control over the mobile network is realised; very important persons or important and high timeliness mobile data services are intelligently protected from influences; the authorized bandwidth of the service in the user policy can be intelligently improved, the throughput of the network can be maximized and the network experiences of the user can be improved; and the mobile network load can also be intelligently protected so as to avoid overload, thereby improving the mobile network quality, and improving the network experience of the user.

What is claimed is:

1. A service control method, comprising:
a user behavior analysis system (UBAS) server acquiring relevant information of a user service and real-time state information of a service used by a user, wherein the relevant information of the user service comprises: information needing to be referred to for regulating a control policy for the user service;
the UBAS server monitoring a current service state of a mobile network based on the relevant information and the real-time state information which are acquired; and
the UBAS server generating or adjusting user control policy information according to a result of the monitoring, and issuing the generated or adjusted user control policy information;

wherein the UBAS server monitoring the current service state of the mobile network based on the relevant information and the real-time state information which are acquired comprises: the UBAS server monitoring the current service state of the mobile network in accordance with a preset dimension and a preset index based on the relevant information and the real-time state information which are acquired, wherein the preset dimension is used for identifying a monitoring range of the mobile network; wherein the UBAS server monitoring the current service state of the mobile network in accordance with the preset dimension and the preset index based on the relevant information and the real-time state information which are acquired comprises: the UBAS server aggregating, in a preset monitoring period, the relevant information and the real-time state information which are acquired in accordance with the preset dimension and the preset index to monitor the current service state of the mobile network, wherein when the preset monitoring period expires, a data region subjected to the aggregation is switched so that aggregation is performed on a new data region, and a value of a preset index associated with a preset dimension in accordance of which aggregation is performed on the switched data is reported, and the relevant information is acquired at an interval of a preset period, wherein the preset period is less than or equal to the monitoring period.

2. The method according to claim 1, wherein the monitoring range of the mobile network identified by the preset dimension comprises at least one of: a service used by an international mobile subscriber identification number, a service identified by service identification, a service born by a cell and a service born by a cell group.

3. The method according to claim 1, wherein the preset index comprises: a traffic and/or a packet loss ratio.

4. The method according to claim 1, wherein the relevant information of the user service comprises at least one of: a type of the user service and a quality of service of the user service; and the real-time state information comprises at least one of: a real-time traffic of the user service.

5. The method according to claim 1, wherein the UBAS server aggregating, in the preset monitoring period, the relevant information and the real-time state information in accordance with the preset dimension and the preset index to monitor the current service state of the mobile network comprises:

the UBAS server filtering the relevant information and the real-time state information involved in the aggregation according to a preset filtering condition in the preset dimension; and the UBAS server aggregating the relevant information and the real-time state information which are obtained through the filtering to monitor the current service state of the mobile network.

6. The method according to claim 1, wherein the UBAS server generating or adjusting the user control policy information according to the result of the monitoring and issuing the generated or adjusted user control policy information comprises:

in a case where a value of the preset index associated with the preset dimension of the switched data region is greater than a preset index threshold associated with the preset dimension, the UBAS server selecting N larger preset index values from preset index values corresponding to low level services in accordance with the preset dimension, wherein N is a natural number; and the UBAS server generating or adjusting the user control policy information of the preset dimension associated with the N preset index values according to an adjustment ratio, and issuing the generated or adjusted user control policy information, wherein an authorized bandwidth in the user control policy information is an original authorized bandwidth multiplying the adjustment ratio, and the adjustment ratio is a downward adjustment ratio.

7. The method according to claim 1, wherein the UBAS server generating or adjusting the user control policy information according to the result of the monitoring and issuing the generated or adjusted user control policy information comprises:

in a case where a value of the preset index associated with the preset dimension of the switched data region is less than a preset index threshold associated with the preset dimension, the UBAS server selecting N preset index values with larger bandwidth utilization ratios from the preset index values in accordance with the preset dimension, wherein N is a natural number; and the UBAS server generating or adjusting the user control policy information of the preset dimension associated with the N preset index values according to an adjustment ratio, and issuing the generated or adjusted user control policy information, wherein an authorized bandwidth in the user control policy information is an original authorized bandwidth multiplying the adjustment ratio, and the adjustment ratio is an upward adjustment ratio.

8. The method according to claim 6, wherein the adjustment ratio is obtained using the following formula:

(Top−(Band−Thr))/Top, where Thr represents a threshold bandwidth of a cell, Band represents a bandwidth that the cell actually uses, and Top represents an actual total bandwidth of the preset dimension associated with the N preset index values.

9. A service control device, comprising: a processor coupled with a memory and configured to execute program components stored on the memory; wherein the program components comprise:

an acquisition component which is configured to acquire relevant information of a user service and real-time state information of a service used by a user, wherein the relevant information of the user service comprises: information needing to be referred to for regulating a control policy for the user service;

a monitoring component which is configured to monitor a current service state of a mobile network based on the relevant information and the real-time state information which are acquired; and a processing component which is configured to generate or adjust user control policy information according to a result of the monitoring, and issue the generated or adjusted user control policy information;

wherein the monitoring component is configured to monitor the current service state of the mobile network in accordance with a preset dimension and a preset index based on the relevant information and the real-time state information which are acquired, wherein the preset dimension is used for identifying a monitoring range of the mobile network; wherein the monitoring component comprises: an aggregation element which is configured to aggregate, in a preset monitoring period, the relevant information and the real-time state information which are acquired in accordance with the preset dimension and the preset index to monitor the current service state of the mobile network, wherein when the preset monitoring period expires, an data region subjected to the aggregation is switched so that the aggregation is performed on a new data region, and a value of a preset index associated with a preset dimension in accordance of which aggregation is performed on the switched data is reported, and the relevant information is acquired at an interval of a preset period, wherein the preset period is less than or equal to the monitoring period.

10. The method according to claim 7, wherein the adjustment ratio is obtained using the following formula:

(Top−(Band−Thr))/Top, where Thr represents a threshold bandwidth of a cell, Band represents a bandwidth that the cell actually uses, and Top represents an actual total bandwidth of the preset dimension associated with the N preset index values.

11. The device according to claim 9, wherein the monitoring range of the mobile network identified by the preset dimension comprises at least one of: a service used by an international mobile subscriber identification number, a service identified by service identification, a service born by a cell and a service born by a cell group.

12. The device according to claim 9, wherein the preset index comprises: a traffic and/or a packet loss ratio.

13. The device according to claim 9, wherein the relevant information of the user service comprises at least one of: a type of the user service and a quality of service of the user service; and the real-time state information comprises at least one of: a real-time traffic of the user service.

14. The device according to claim 9, wherein the aggregation element is configured to filter the relevant information and real-time state information involved in the aggregation according to a preset filtering condition in the preset dimension; and aggregate the relevant information and the real-time state information which are obtained through the filtering to monitor the current service state of the mobile network.

15. The device according to claim 9, wherein the processing component comprises:

a first adjustment element which is configured to select, in a case where a value of the preset index associated with the preset dimension of the switched data region is greater than a preset index threshold associated with the preset dimension, N larger preset index values from preset index values corresponding to low level services in accordance with the preset dimension, wherein N is a natural number; and generate or adjust the user control policy information of the preset dimension associated with the N preset index values according to an adjustment ratio, and issue the generated or adjusted user control policy information, wherein an authorized bandwidth in the user control policy information is an original authorized bandwidth multiplying the adjustment ratio, and the adjustment ratio is a downward adjustment ratio.

16. The device according to claim 9, wherein the processing component comprises:

a second adjustment element which is configured to select, in a case where a value of the preset index associated with the preset dimension of the switched data region is less than a preset index threshold associated with the preset dimension, N preset index values with larger bandwidth utilization ratios from the preset index values in accordance with the preset dimension, wherein N is a natural number; and generate or adjust the user control policy information of the preset dimension associated with the N preset index values according to an adjustment ratio, and issue same, wherein an authorized bandwidth in the user control policy information is an original authorized bandwidth multiplying the adjustment ratio, and the adjustment ratio is an upward adjustment ratio.

* * * * *